United States Patent
Perry et al.

(10) Patent No.: US 12,330,214 B1
(45) Date of Patent: Jun. 17, 2025

(54) PRINTED POROUS MEDIA, SUCH AS FOR USE IN AEROSPACE PARTS, AND ASSOCIATED SYSTEMS AND METHODS

(71) Applicant: Blue Origin Manufacturing, LLC, Huntsville, AL (US)

(72) Inventors: Matthew Perry, Federal Way, WA (US); Lloyd J. Droppers, Renton, WA (US); Wade Stahl, Kent, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 298 days.

(21) Appl. No.: 16/788,260

(22) Filed: Feb. 11, 2020

Related U.S. Application Data

(60) Provisional application No. 62/803,813, filed on Feb. 11, 2019.

(51) Int. Cl.
| | | |
|---|---|---|
| *B22F 10/20* | (2021.01) | |
| *B22F 3/11* | (2006.01) | |
| *B22F 10/10* | (2021.01) | |
| *B23K 26/064* | (2014.01) | |
| *B23K 26/34* | (2014.01) | |

(Continued)

(52) U.S. Cl.
CPC ............... *B22F 10/20* (2021.01); *B22F 3/11* (2013.01); *B23K 26/064* (2015.10); *B23K 26/34* (2013.01); *B22F 10/10* (2021.01); *B22F 2202/11* (2013.01); *B33Y 10/00* (2014.12); *B33Y 80/00* (2014.12)

(58) Field of Classification Search
CPC . B22F 10/00; B22F 10/20; B22F 3/11; B33Y 10/00; B33Y 80/00
See application file for complete search history.

(56) References Cited

U.S. PATENT DOCUMENTS

| 18,058 A | 8/1857 | Raymond |
|---|---|---|
| 1,595,300 A | 8/1926 | Halloran |
| 1,884,144 A | 10/1932 | Norquist |

(Continued)

FOREIGN PATENT DOCUMENTS

| CN | 202448086 | 9/2012 |
|---|---|---|
| CN | 103831775 | 6/2014 |

(Continued)

OTHER PUBLICATIONS

Fantozzi et al.,Experimental Study on Pressure Losses in Porous Materials, Jun. 11-11, 2018, Siemens (Year: 2018).*

(Continued)

*Primary Examiner* — Jeffrey T Carley
*Assistant Examiner* — Dilnessa B Belay
(74) *Attorney, Agent, or Firm* — Hogan Lovells US LLP

(57) ABSTRACT

Porous media and methods of manufacturing porous media, such as for use in aerospace parts, are described herein. In some embodiments, a porous medium comprises a monolithic structure having a plurality of vertically stacked metal layers. Individual ones of the metal layers can include an array of spaced apart weld beads, and the arrays of weld beads can be rotationally and/or laterally offset from one another. For example, the arrays of weld beads can be rotationally offset from another by an angle that is not a factor of 360 degrees. The weld beads can together define a plurality of non-discrete passageways extending through the monolithic structure.

8 Claims, 7 Drawing Sheets

(51) Int. Cl.
*B33Y 10/00* (2015.01)
*B33Y 80/00* (2015.01)

(56) References Cited

U.S. PATENT DOCUMENTS

| | | | |
|---|---|---|---|
| 2,037,663 A | 4/1936 | Lalor | |
| 2,043,337 A | 6/1936 | Smith | |
| 2,307,273 A | 6/1943 | Hughes | |
| 2,969,826 A | 3/1956 | Allen et al. | |
| 3,027,159 A | 3/1962 | Yates | |
| 3,159,179 A | 12/1964 | Lain | |
| 3,166,837 A | 1/1965 | Frick et al. | |
| 3,233,315 A | 2/1966 | Levake | |
| 3,243,929 A | 4/1966 | Strandlund et al. | |
| 3,253,323 A | 5/1966 | Saueressig | |
| 3,329,396 A | 7/1967 | Heaton et al. | |
| 3,438,316 A | 4/1969 | Rodier | |
| 3,491,569 A | 6/1970 | Sabirov | |
| 3,711,040 A | 1/1973 | Carver | |
| 3,787,022 A | 1/1974 | Wilcox et al. | |
| 3,825,167 A | 7/1974 | Komorek et al. | |
| 3,828,551 A | 8/1974 | Schmidt | |
| 3,900,629 A * | 8/1975 | Spencer | F01D 5/184 156/263 |
| 2,870,599 A | 10/1975 | Bolner | |
| 3,910,374 A | 10/1975 | Holehouse | |
| 3,912,172 A | 10/1975 | Bolner | |
| 3,948,346 A | 4/1976 | Schindler | |
| 4,084,739 A | 4/1978 | Koltz et al. | |
| 4,094,492 A | 6/1978 | Beeman et al. | |
| 4,154,641 A | 5/1979 | Hotton | |
| 4,184,238 A | 1/1980 | Carey | |
| 4,235,303 A | 11/1980 | Dhoore et al. | |
| 4,257,998 A | 3/1981 | Diepenbrock, Jr. et al. | |
| 4,265,955 A | 5/1981 | Harp et al. | |
| 4,344,591 A | 8/1982 | Jackson | |
| 4,513,948 A | 4/1985 | Konig | |
| 4,569,386 A | 2/1986 | Mine | |
| 4,594,120 A | 6/1986 | Bourland, Jr. et al. | |
| 4,687,691 A | 8/1987 | Kay | |
| 4,796,839 A | 1/1989 | Davis | |
| 4,811,182 A | 3/1989 | Solomon | |
| 4,889,276 A | 12/1989 | Cadwell et al. | |
| 4,910,065 A | 3/1990 | McKinney | |
| 4,964,340 A | 10/1990 | Daniels et al. | |
| 4,971,746 A | 11/1990 | Ferrer | |
| 5,033,519 A | 7/1991 | Puffer et al. | |
| 5,080,306 A | 1/1992 | Porter et al. | |
| 5,101,662 A | 4/1992 | Fisher | |
| 5,129,602 A | 7/1992 | Leonard | |
| 5,362,527 A | 11/1994 | Harpell et al. | |
| 5,390,846 A | 2/1995 | Thode | |
| 5,435,478 A | 7/1995 | Wood et al. | |
| 5,445,861 A | 8/1995 | Newton et al. | |
| 5,460,864 A | 10/1995 | Heitkamp | |
| 5,460,865 A | 10/1995 | Tsotsis | |
| 5,568,901 A | 10/1996 | Stiennon et al. | |
| 5,575,402 A | 11/1996 | Botsolas | |
| 5,604,010 A | 2/1997 | Hartz et al. | |
| 5,662,761 A | 9/1997 | Middelman et al. | |
| 5,667,167 A | 9/1997 | Kistler | |
| 5,678,784 A | 10/1997 | Marshall, Jr. et al. | |
| 5,685,940 A | 11/1997 | Hopkins et al. | |
| 5,765,361 A | 6/1998 | Jones et al. | |
| 5,784,919 A | 7/1998 | Mattson | |
| 5,785,919 A | 7/1998 | Wilson | |
| 5,806,725 A | 9/1998 | Bennett | |
| 5,830,548 A | 11/1998 | Andersen et al. | |
| 5,873,549 A | 2/1999 | Lane et al. | |
| 5,895,699 A | 4/1999 | Corbett et al. | |
| 5,927,653 A | 7/1999 | Mueller et al. | |
| 6,039,325 A | 3/2000 | Steinetz et al. | |
| 6,114,652 A | 9/2000 | Clarke et al. | |
| 6,173,880 B1 | 1/2001 | Ding et al. | |
| 6,180,206 B1 | 1/2001 | Kain, Jr. | |
| 6,182,787 B1 | 2/2001 | Kraft et al. | |
| 6,199,745 B1 | 3/2001 | Campbell et al. | |
| 6,235,655 B1 | 5/2001 | Jozaki | |
| 6,349,459 B1 | 2/2002 | Dean | |
| 6,402,091 B1 | 6/2002 | Hansen | |
| 6,450,395 B1 | 9/2002 | Weeks et al. | |
| 6,457,306 B1 | 10/2002 | Abel et al. | |
| 6,488,323 B1 | 12/2002 | Bouligny | |
| 6,509,081 B1 | 1/2003 | Diamond | |
| 6,513,760 B1 | 2/2003 | Mueller et al. | |
| 6,668,543 B2 | 12/2003 | Linner | |
| 6,742,697 B2 | 6/2004 | McTernan et al. | |
| 6,871,725 B2 | 3/2005 | Johnson | |
| 6,908,690 B2 | 6/2005 | Waldron et al. | |
| 6,945,498 B2 | 9/2005 | Mueller et al. | |
| 7,000,402 B2 | 2/2006 | Benians | |
| 7,197,852 B2 | 4/2007 | Grillos | |
| 7,389,636 B2 | 6/2008 | Fowler et al. | |
| 7,434,659 B2 | 10/2008 | Ayle | |
| 7,448,528 B2 | 11/2008 | Forrest et al. | |
| 7,461,769 B2 | 12/2008 | Waldron et al. | |
| 7,464,852 B2 | 12/2008 | Waldron et al. | |
| 7,674,418 B2 | 3/2010 | Matsumoto et al. | |
| 7,748,592 B2 | 7/2010 | Koga et al. | |
| 7,785,098 B1 | 8/2010 | Appleby et al. | |
| 7,998,389 B2 | 8/2011 | Burchett et al. | |
| 8,047,472 B1 | 11/2011 | Brand et al. | |
| 8,282,040 B1 | 10/2012 | Westman et al. | |
| 8,375,839 B2 | 2/2013 | Landi | |
| 8,408,358 B1 | 4/2013 | Hermiller et al. | |
| 8,408,443 B2 | 4/2013 | Miryekta et al. | |
| 8,475,894 B2 | 7/2013 | Noble et al. | |
| 8,491,743 B2 | 7/2013 | Pham et al. | |
| 8,511,429 B1 | 8/2013 | Yu et al. | |
| 8,534,530 B2 | 9/2013 | Biggs | |
| 8,696,843 B1 | 4/2014 | Dean | |
| 8,720,817 B1 | 5/2014 | Kismarton et al. | |
| 9,079,674 B1 | 7/2015 | Grillos | |
| 10,478,951 B2 | 11/2019 | Ohrmann | |
| 11,148,204 B2 * | 10/2021 | Colin | B22F 10/20 |
| 2001/0015157 A1 | 8/2001 | Neal | |
| 2002/0014070 A1 * | 2/2002 | Stechman, Jr. | F02K 9/60 60/257 |
| 2002/0070077 A1 | 6/2002 | Porte et al. | |
| 2002/0190103 A1 | 12/2002 | Yoshinaga | |
| 2003/0150961 A1 | 8/2003 | Boelitz et al. | |
| 2004/0067364 A1 | 4/2004 | Ishikawa et al. | |
| 2004/0099996 A1 * | 5/2004 | Herzog | B33Y 30/00 264/401 |
| 2004/0129763 A1 | 7/2004 | Burford et al. | |
| 2004/0156478 A1 | 8/2004 | Appleby et al. | |
| 2004/0234352 A1 | 11/2004 | Vanderpol et al. | |
| 2006/0049316 A1 | 3/2006 | Antonenko et al. | |
| 2006/0067364 A1 | 3/2006 | Jung et al. | |
| 2006/0108058 A1 | 5/2006 | Chapman et al. | |
| 2006/0188696 A1 | 8/2006 | Grose et al. | |
| 2007/0012820 A1 | 1/2007 | Buehler | |
| 2007/0238379 A1 | 10/2007 | Bhatnagar et al. | |
| 2008/0179448 A1 | 7/2008 | Layland et al. | |
| 2008/0256960 A1 | 10/2008 | Greason et al. | |
| 2009/0263627 A1 | 10/2009 | Hand et al. | |
| 2009/0302252 A1 | 12/2009 | Cheung | |
| 2010/0078985 A1 | 4/2010 | Mahoney et al. | |
| 2010/0170746 A1 | 7/2010 | Restuccia et al. | |
| 2010/0243803 A1 | 9/2010 | Westre et al. | |
| 2010/0243903 A1 | 9/2010 | Fahr et al. | |
| 2010/0276545 A1 | 11/2010 | Chavagnac et al. | |
| 2010/0326045 A1 | 12/2010 | Lai | |
| 2011/0012290 A1 | 1/2011 | Burchett et al. | |
| 2011/0107808 A1 | 5/2011 | Gil | |
| 2011/0133025 A1 | 6/2011 | Vauchel et al. | |
| 2011/0189440 A1 | 8/2011 | Appleby et al. | |
| 2011/0302905 A1 | 12/2011 | Weinberg | |
| 2012/0037449 A1 | 2/2012 | Ayle | |
| 2012/0174748 A1 | 7/2012 | Landi | |
| 2013/0056912 A1 * | 3/2013 | O'Neill | B29C 64/153 264/497 |
| 2014/0077037 A1 | 3/2014 | Hand | |

(56) References Cited

U.S. PATENT DOCUMENTS

| | | | |
|---|---|---|---|
| 2014/0165361 A1 | 6/2014 | Stulc et al. | |
| 2019/0299290 A1* | 10/2019 | Kuhns | B22F 7/002 |
| 2022/0324071 A1 | 10/2022 | Lu | |

FOREIGN PATENT DOCUMENTS

| | | |
|---|---|---|
| CN | 104175285 | 8/2017 |
| CN | 109129265 | 6/2020 |
| CN | 111922657 | 3/2022 |
| CN | 112873102 | 3/2022 |
| CN | 218267296 | 1/2023 |
| CN | 218504407 | 2/2023 |
| DE | 10058339 A1 | 6/2002 |
| EP | 0193812 A3 | 4/1987 |
| EP | 0741655 | 11/1996 |
| EP | 1340316 A1 | 9/2003 |
| EP | 2308636 B1 | 5/2012 |
| GB | 2447278 B | 12/2011 |
| JP | 2000176655 | 6/2000 |
| JP | 2001025886 | 1/2001 |
| JP | 2001219280 | 8/2001 |
| JP | 2003239698 A | 8/2003 |
| WO | WO-2009032585 | 3/2009 |

OTHER PUBLICATIONS

Aerospace America, "The 787 and the A350 Teasing out the Facts," Publication of the American Institute of Aeronautics and Astronautics, Jun. 2009, 3 pages.

Hulka et al., Modification and Verification Testing of a Russian NK-33 Rocket Engine for Reusable and Restartable Applications, AIAA 98-3361, 1998, 26 pages.

Caterino et al., "Robotized assembly and inspection of composite fuselage panels: the Labor project approach," IOP Conf. Series: Materials Science and Engineering, 10th EASN 2020, 9 pages.

* cited by examiner

PRINTED POROUS MEDIA, SUCH AS FOR USE IN AEROSPACE PARTS, AND ASSOCIATED SYSTEMS AND METHODS

CROSS REFERENCE TO RELATED APPLICATION

This application claims priority to U.S. Provisional Patent Application No. 62/803,813, titled "PRINTED POROUS MEDIA, SUCH AS FOR USE IN AEROSPACE PARTS, AND ASSOCIATED SYSTEMS AND METHODS," and filed Feb. 11, 2019, which is incorporated herein by reference in its entirety.

TECHNICAL FIELD

The present technology relates generally relates to systems and methods for additively manufacturing porous media, such as for use in aerospace parts.

BACKGROUND

Rocket engines, such as liquid propellant rocket engines, typically include one or more injectors configured to inject the propellant into a combustion chamber. The propellant is ignited in the combustion chamber to generate thrust. Such injectors generally include a face plate that abuts the combustion chamber and through which the propellant is injected into the combustion chamber. Because of its position proximate the combustion chamber, the face plate must withstand the high temperatures and pressures generated by the combusting propellant.

Some conventional rocket engines include injectors having porous face plates formed from a material including multiple metal wire screens that are diffusion bonded together to form a rigid sheet. During operation, the propellant can bleed through the sheet of wire screens to facilitate cooling the injector face plate via transpiration. More specifically, many rocket engines utilize the material manufactured under the trademark "Rigimesh" by Pall Corporation. However, "Rigimesh" and other conventional porous media are difficult if not impossible to form into complex geometric shapes-which greatly limits their usefulness in many aerospace applications, where the part geometry is often complex. Moreover, such porous media must be attached (e.g., bolted, welded, etc.) to a solid part, such as a manifold, combustion chamber, etc., after the solid part is already formed.

BRIEF DESCRIPTION OF THE DRAWINGS

Many aspects of the present technology can be better understood with reference to the following drawings. The components in the drawings are not necessarily to scale. Instead, emphasis is placed on clearly illustrating the principles of the present technology.

DETAILED DESCRIPTION

Figure 1:
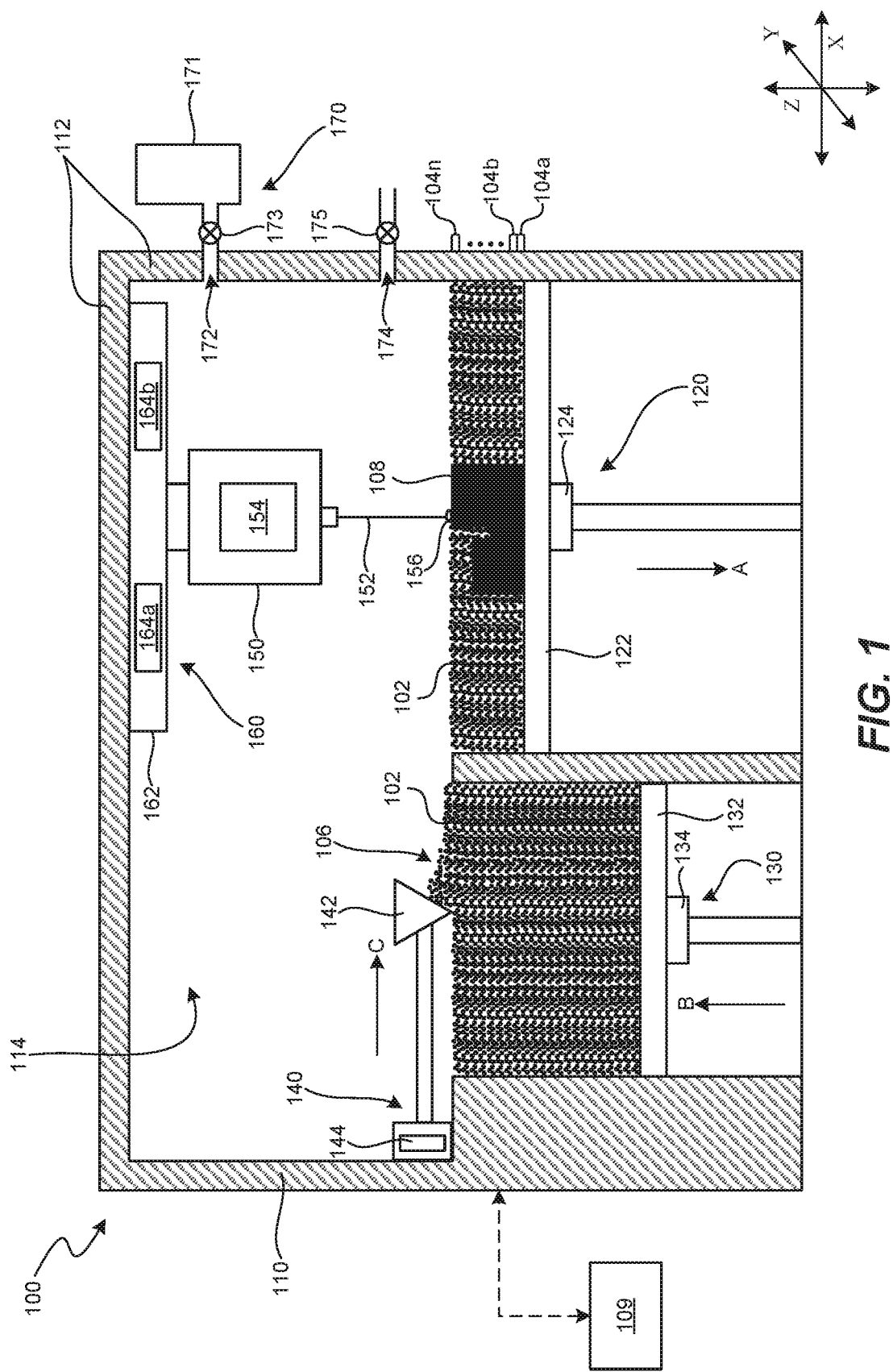
FIG. 1 is a partially-schematic, partially cross-sectional view of an additive manufacturing system configured in accordance with embodiments of the present technology.

Aspects of the present technology are directed generally toward porous media, and additive manufacturing processes for manufacturing porous media, such as for use in aerospace parts. In several of the embodiments described below, a method of manufacturing a porous media includes selectively heating multiple layers of additive material to form an array of spaced-apart weld beads in/at individual layers. The weld beads can be rotationally and/or laterally offset from one another, so that together, they form a monolithic structure. For example, in some embodiments the arrays of weld beads can have the same size and/or arrangement—but the orientation and/or lateral position of each array can be offset relative to all or a portion of the arrays in the other layers. By offsetting the arrays, the manufactured porous media can define multiple non-discrete passageways extending therethrough. That is, the porous media can define a multitude of tortuous, serpentine, interconnected, flow paths therethrough.

In some embodiments, the layers of additive material can be heated via a relatively simple pattern of linear, back-and-forth passes with a laser beam or other energy beam. Accordingly, a representative method in accordance with the present technology for manufacturing the porous media does not require a computer model that details/defines each of the individual passageways to be formed through the porous media. In another aspect of the present technology, the porous media can be monolithically formed together with a solid part because it is additively manufactured, and can therefore be formed on/at otherwise inaccessible portions (e.g., internal chambers) of the solid part and/or without requiring separate fasteners to join it to the solid part.

In another aspect of the present technology, the porous media can be designed to have a specific porosity for controlling a flow rate of a fluid therethrough. For example, the spacing between the weld beads in each layer, the thickness of the weld beads, the total number of layers, among other parameters, can be varied to vary the flow rate of the fluid. In some embodiments, the weld beads can define a plurality of non-discrete passageways that inhibit or even prevent jetting or other tube-like fluid flow through the porous media, thereby encouraging uniform and/or even flow. In particular embodiments, the porous media can be utilized as a face plate of a rocket injector to provide both metered fuel injection and transpiration cooling of the fuel injector.

Certain details are set forth in the following description and in FIGS. 1-3D to provide a thorough understanding of various embodiments of the present technology. In other instances, well-known structures, materials, operations, and/or systems often associated with additive manufacturing, fuel injectors, rocket engines, and/or other components, are not shown or described in detail in the following disclosure to avoid unnecessarily obscuring the description of the various embodiments of the technology. Those of ordinary skill in the art will recognize, however, that the present technology can be practiced without one or more of the details set forth herein, and/or with other structures, methods, components, and so forth. For example, while many of the embodiments are described below in the context of transpiration cooling of fuel injectors, the porous media of the present technology can be used in other contexts and/or for other purposes (e.g., for filtering), alternatively to or in addition to transpiration cooling. The porous media of the present technology can be used in contexts and/or industries other than aerospace, for example, stationary power generation combustors.

The accompanying Figures depict embodiments of the present technology and are not intended to limit the scope of the present technology. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the present technology. Many of the details, dimensions, angles and other features shown in the Figures are merely illustrative of particular embodiments of the disclosure. Accordingly, other embodiments can have other details, dimensions, angles and features without departing from the spirit or scope of the present technology. In addition, those of ordinary skill in the art will appreciate that further embodiments of the present technology can be practiced without several of the details described below.

FIG. 1 is a partially-schematic, partially cross-sectional view of an additive manufacturing system 100 ("system 100") configured in accordance with embodiments of the present technology. As shown in FIG. 1, the system 100 can include a chamber 110 (shown in cross-section) in which a part support structure 120 and a material support structure 130 are positioned. The part support structure 120 includes a build platform (e.g., a plate) 122 that carries an additive material 102, generally in the form of multiple, sequentially deposited layers 104 (identified individually as layers 104a-104n), each of which is initially in a powder form (e.g., a powder bed). The material support structure 130 includes a supply platform 132 that carries a reservoir or stock 106 of the additive material 102. A material mover 140 can be configured to move a portion of the additive material 102 from the reservoir 106 onto the build platform 122 to form another (e.g., an uppermost) layer 104 of the additive material 102. An energy director 150 is positioned over/above the build platform 122 in the chamber 110 and configured to direct energy (e.g., an energy beam 152) toward the additive material 102 to locally heat selected portions of each sequentially deposited layer 104 of the additive material 102. This in turn melts and consolidates the additive material 102 to form a stack of hardened material layers that together form a manufactured part 108. A motion device 160 provides relative movement between the energy director 150 and the additive material 102 on the build platform 122.

In the illustrated embodiment, the chamber 110 includes chamber walls 112 that define an interior chamber volume 114. In some embodiments, the environment within the chamber volume 114 can be controlled in order to better control an additive manufacturing process carried out by the system 100. For example, the system 100 can include a chamber gas system 170. The chamber gas system 170 can control the atmosphere in the chamber volume 114 to be inert, so as to reduce or eliminate the likelihood that the additive material 102 and/or the manufactured part 108 become contaminated with potentially reactive materials (e.g., oxygen and/or water). Accordingly, the chamber gas system 170 can include an inert gas supply 171 that provides an inert gas (e.g., argon) to the chamber 110 via a chamber inlet 172 and an associated inlet valve 173. The inert gas displaces air and/or other contaminants (e.g., water vapor) via a chamber outlet 174 and associated outlet valve 175. By using the inert gas supply 171, an operator can purge the chamber volume 114 of air and/or other contaminating gases before the additive manufacturing process is initiated. In some embodiments, the chamber gas system 170 can alternatively or additionally include a vacuum source (e.g., a pump) for reducing the pressure within the chamber 110.

The energy director 150 can be used to supply and/or direct the energy beam 152 toward the additive material 102 on the build platform 122, which in turn produces a corresponding spot (e.g., a laser spot) 156 at/on the additive material 102. The energy beam 152 can include any of a variety of suitable electromagnetic energy types, such as light and/or particles (e.g., electrons). In some embodiments, the energy beam 152 includes laser energy in the form of a laser beam, and accordingly, several embodiments are described below in the context of a laser beam. In other embodiments, other suitable energy beams can be used. To direct the energy toward the additive material 102, the energy director 150 can include a director element 154 (e.g. a laser director) configured to focus and/or concentrate the energy beam 152—for example, using optical elements for a light beam, or electromagnetic elements (e.g., to locally alter the electromagnetic field) for an electron beam or other particle beam.

In some embodiments, the motion device 160 includes a gantry 162 mounted to one (e.g., an upper one) of the chamber walls 112 and configured to support/carry the energy director 150. The motion device 160 can include multiple actuators 164 (identified individually as a first actuator 164a and a second actuator 164b) that provide for the relative motion between the energy director 150 and the build platform 122. For example, the first actuator 164a can move the gantry 162 along at least one axis (e.g., along an X-axis) and the second actuator 164b can be move the gantry 162 along at least one other axis (e.g., along a Y-axis). Moving the gantry 162 along the X-axis and the Y-axis moves the energy director 150 relative to the build platform 122 and varies the position of the energy beam 152 and the laser spot 156 across the additive material 102 on the build platform 122. This movement can be selectively varied (e.g., in a predetermined pattern) to produce a portion of the part 108 corresponding to a particular one of the layers 104.

In representative embodiments, the part support structure 120 includes a first actuator 124 operably coupled to the build platform 122 and configured to move the build platform 122 along at least one axis (e.g., along a Z-axis), and the material support structure 130 includes a second actuator 134 operably coupled to the supply platform 132 and configured to move the supply platform 132 along at least one axis (e.g., along the Z-axis). The material mover 140 can include a third actuator 144 operably coupled to a grader head 142 and configured to move the grader head 142 along at least one axis (e.g., along the X-axis). The grader head 142 can include a blade, roller, or other element configured to engage the additive material 102 on the supply platform 132 and to smoothly distribute (e.g., push, roll, etc.) the additive material 102 across the build platform 122 to form an uppermost layer (e.g., the $n^{th}$ layer 104n) of the additive material 102.

The system 100 can include a controller 109 (shown schematically; e.g., a computer-numeric-controlled (CNC) controller) programmed with instructions for directing the operations and motions carried out by the part support structure 120, the material support structure 130, the material mover 140, the energy director 150, the motion device 160, the chamber gas system 170, and/or other components of the system 100. Accordingly, the controller 109 can include a processor, memory, input/output devices, and a computer-readable medium containing instructions for performing some or all of the tasks described herein. In some embodiments, the controller 109 is configured to receive a computer-generated model of the part 108 and to control the operations and motions of the components of the system 100 to manufacture the part 108 based on the computer-generated model. In some embodiments, the controller 109 is configured to receive feedback information about the additive manufacturing process from, for example, various sensors, cameras, etc., (not shown) that can be located within the chamber 110. In some embodiments, the controller 109 is configured to modify/direct operations and motions of the various components of the system 100 based at least in part on the received feedback information.

During operation of the system 100, the energy beam 152 can first be moved across the first layer 104a of the additive material 102 on the build platform 122 in a pattern that produces the portion of the part 108 corresponding to the first layer 104a. More specifically, the gantry 162 can be moved along the X-axis and/or the Y-axis to move the energy director 150 relative to the build platform 122, thus selectively varying the position of the spot 156 across the first layer 104a. Next, the first actuator 124 can lower the build platform 122 in a direction A (indicated by arrow A) along the Z-axis, and the second actuator 134 can raise the supply platform 132 in a direction B (indicated by arrow B) along the Z-axis. The third actuator 144 can then move the grader head 142 along the X-axis in a direction C (indicated by arrow C) to move (e.g., push, roll, etc.) a portion of the additive material 102 in the reservoir 106 to the build platform 122 to form the second layer 104b on the first layer 104a. The third actuator 144 can then retract the grader head 142 along the X-axis and the gantry 162 can be moved along the X-axis and/or the Y-axis to move the energy director 150 relative to the build platform 122 to selectively vary the position of the energy beam 152 across the first layer 104b in a pattern that produces the portion of the part 108 corresponding to the second layer 104b. This process—i.e., sequentially depositing the layers 104 and directing energy toward the layers 104—can be repeated as many times as necessary to form the part 108. For example, in some embodiments, the total number of layers 104 can be greater than 20, greater than 50, greater than 100, greater than 1000, etc.

In some embodiments, the system 100 can include one or more features that are generally similar or identical to the features of the additive manufacturing systems disclosed in U.S. patent application Ser. No. 16/120,050, titled "SYSTEMS AND METHODS FOR CONTROLLING ADDITIVE MANUFACTURING PROCESSES," and filed Aug. 31, 2018, which is incorporated herein by reference in its entirety.

Figure 2:
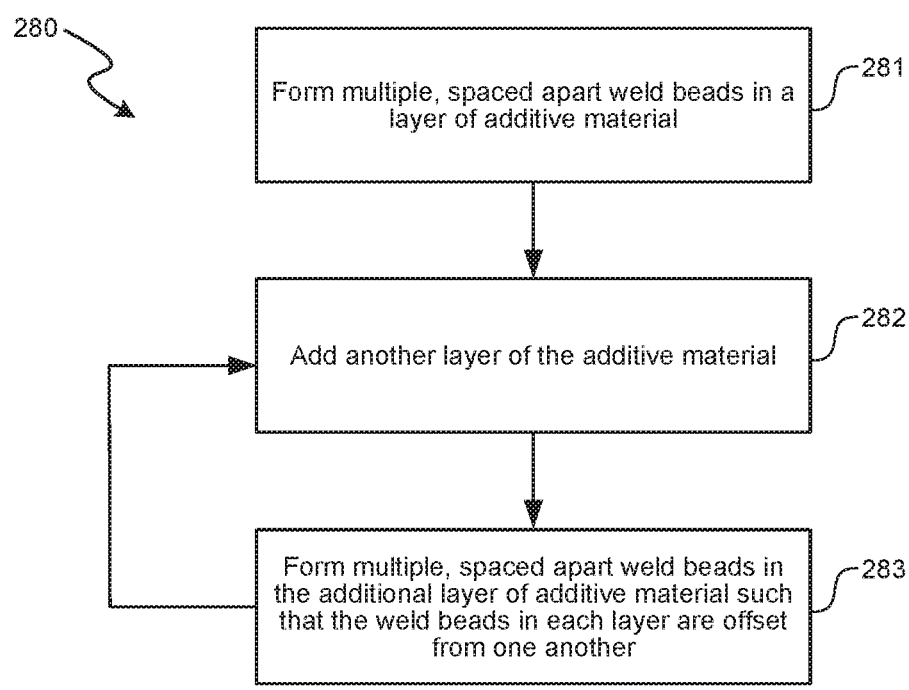
FIG. 2 is a flow diagram of a process for manufacturing a porous media in accordance with embodiments of the present technology.

FIG. 2 is a flow diagram of a process or method 280 for manufacturing a porous medium or structure in accordance with an embodiment of the present technology. In general, the manufactured porous structure is configured to provide metered fluid flow therethrough and can be manufactured as a discrete component or can be integrally/monolithically formed with another solid part. For example, the porous structure can be a face plate of a propellant injector for use in a rocket engine and can be integrally formed with associated parts of the rocket engine—such as a combustion chamber, manifold, etc. In some embodiments, the system 100 and/or another suitable additive manufacturing system (e.g., another laser powder bed manufacturing system) can be used to implement the method 280 illustrated in FIG. 2. For example, FIGS. 3A-3E are top views of the additive material 102 on the build platform 122 of FIG. 1, illustrating various stages in the method 280 for manufacturing a porous structure 390 in accordance with embodiments of the present technology. Accordingly, for the sake of illustration, some features of the method 280 illustrated in FIG. 2 will be described in the context of the embodiments shown in FIGS. 1 and 3A-3E.

Figure 3A:
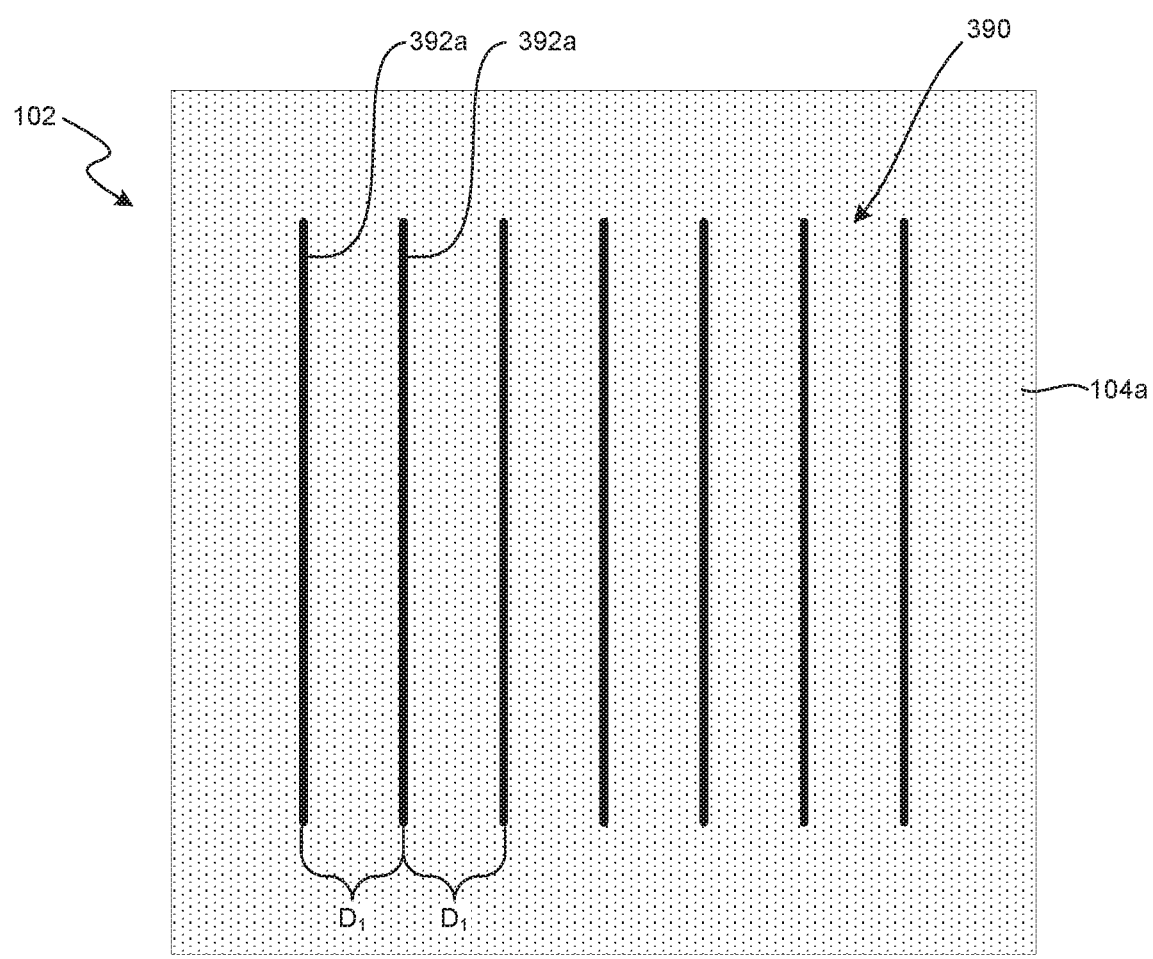
FIGS. 3A-3E are top views of an additive material illustrating various stages in a method for manufacturing a porous media in accordance with embodiments of the present technology.

The method 280 starts at block 281 by forming (e.g., laying) multiple, spaced apart weld beads in/at a layer of additive material. For example, as shown in FIG. 3A an array of first weld beads 392a can be formed in the first layer 104a of the additive material 102. More specifically, the motion device 160 can vary the position of the energy beam 152 (e.g., the spot 156) across the first layer 104a of the additive material 102 to selectively heat, melt, and fuse the additive material 102 to form the first weld beads 392a. In the embodiment illustrated in FIG. 3A, the first weld beads 392a each have a linear shape, are aligned parallel to one another, and are equally spaced apart from one another by a distance $D_1$. In some embodiments, the distance $D_1$ can be between about 0.1-2.0 mm (e.g., about 0.3 mm) and the first weld beads 392a can have a thickness (e.g., in a direction into the plane of FIG. 3A) of between about 1-100 μm (e.g., about 45 μm). In other embodiments, the first weld beads 392a can have other shapes (e.g., curved, irregular, and/or angled), differing dimensions (e.g., thickness, height, and/or length), and/or can have different spacings and/or orientations relative to one another.

In one aspect of the present technology, the first weld beads 392a are not connected to one another such that a first layer of the porous structure 390 is configured to permit fluids and gases to pass therethrough. In contrast, conventional additive manufacturing processes generally strive to interconnect weld beads to form a solid layer. In another aspect of the present technology, the moving device 160 (FIG. 1) need only move the energy director 150 along a relatively simple linear movement path to form the first weld beads 392a. This can reduce the computational burden as compared to manufacturing processes that require intricate curved or discontinuous movement paths.

At block 282, the method 280 includes adding another layer of the additive material. For example, as described above (i) the build platform 122 can be lowered, (ii) the supply platform 132 can be raised, and (iii) the material mover 140 can push a portion of the additive material 102 from the reservoir 106 on the supply platform 132 onto the build platform 122 to form the second layer 104b on the first layer 104a.

Figure 3B:
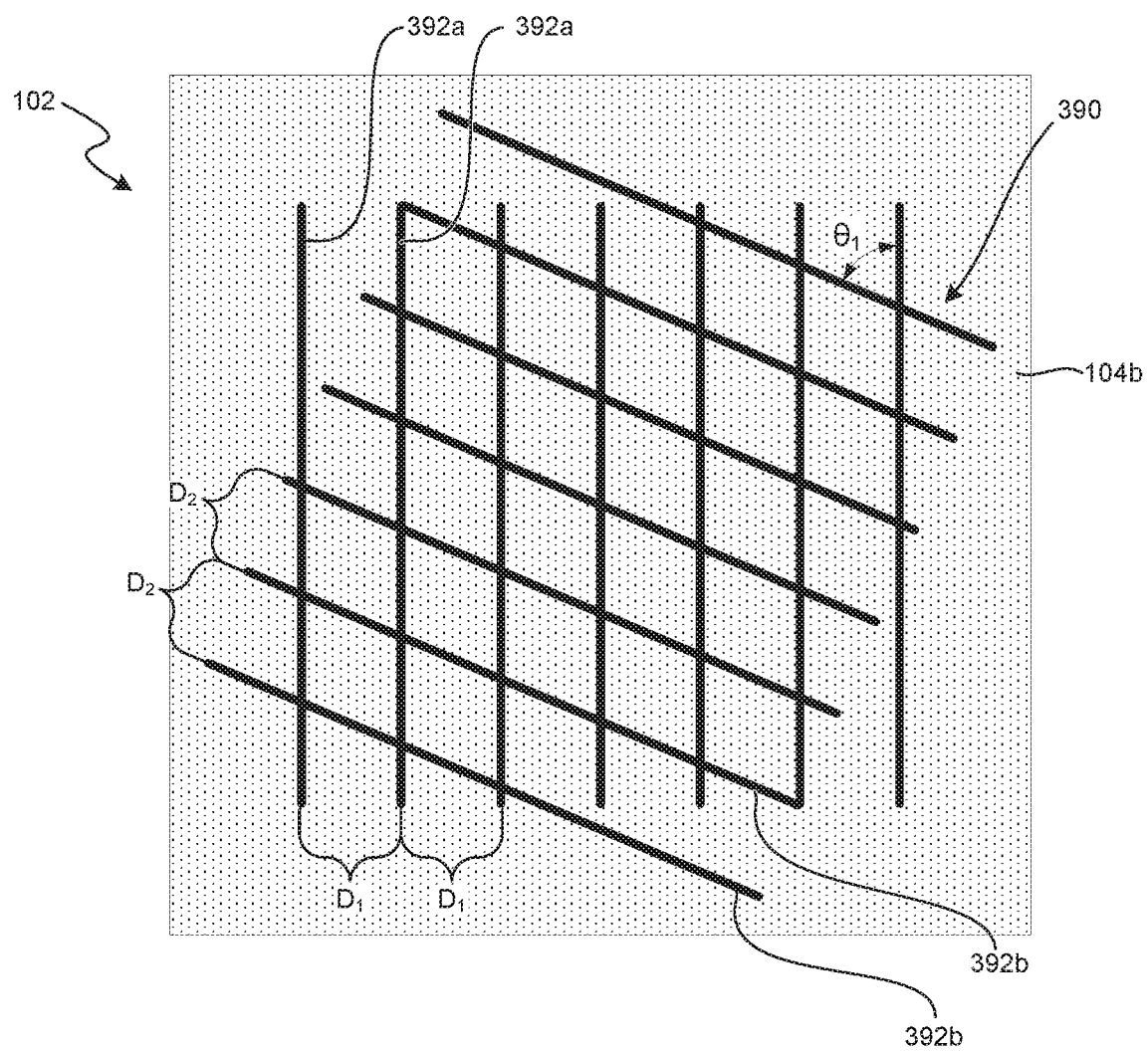

At block 283, the method 280 includes forming multiple, spaced apart weld beads in/at the additional layer of additive material such that the weld beads in each layer are offset from one another. For example, as shown in FIG. 3B an array of second weld beads 392b can be formed in the second layer 104b of the additive material 102. The additive material 102 is shown as partially transparent in FIG. 3B to illustrate the underlying first weld beads 392a. The second weld beads 392b are formed at least partially over the first weld beads 392a to interconnect the weld beads 392 (e.g., such that weld beads 392 form a monolithic structure). In the illustrated embodiment, the second weld beads 392b each have a linear shape, are aligned parallel to one another, and are equally spaced apart from one another by a distance D2. In some embodiments, the array of second weld beads 392b is formed to be generally identical to the array of first weld beads 392a (e.g., the distance D1 equals the distance D2), but the array of second weld beads 392b is rotationally offset from the array of first weld beads 392a by a first angle θ1.

Figure 3C:
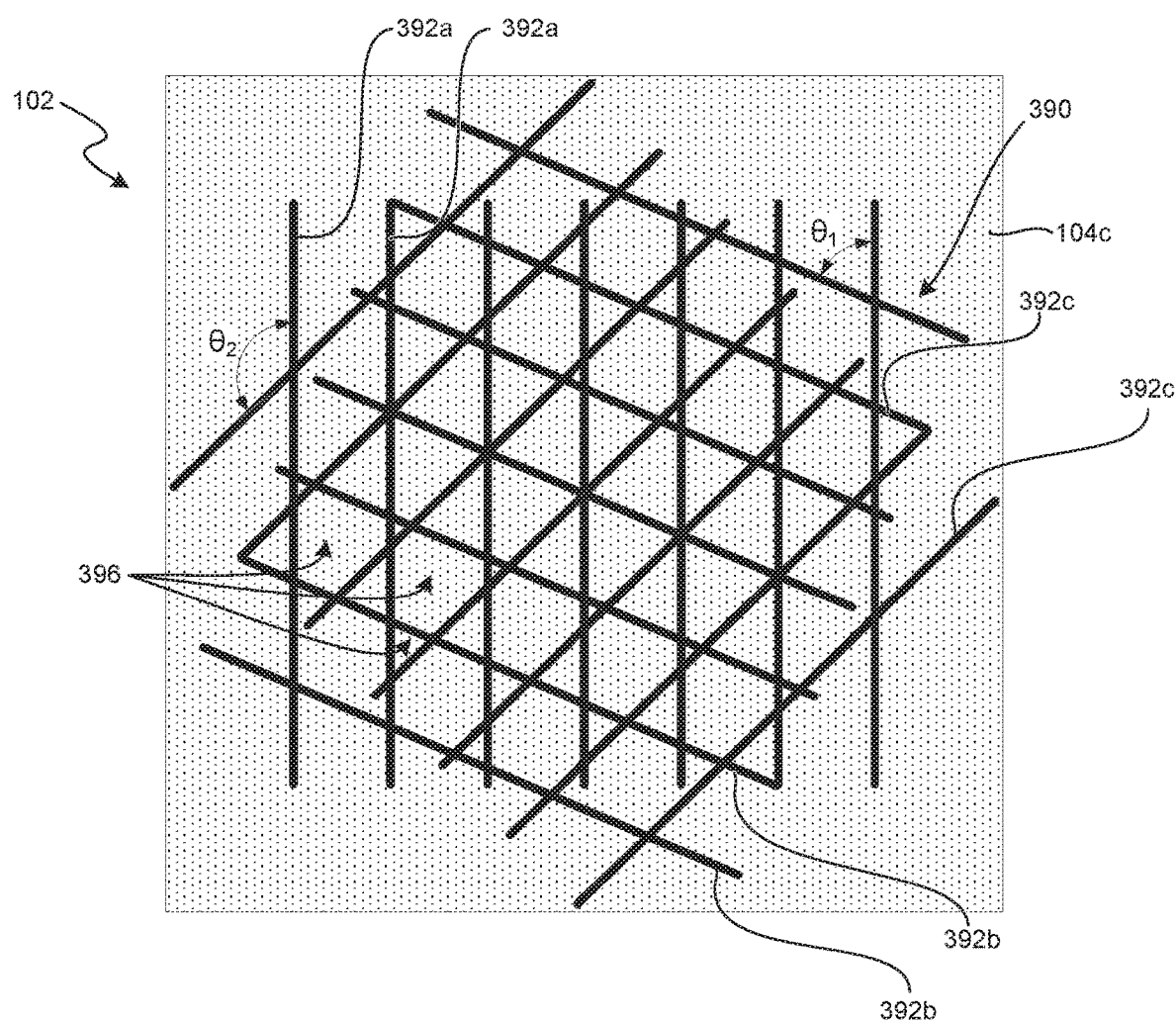

In some embodiments, the first angle θ1 is not a factor of 360°. For example, in a particular embodiment the angle θ1 is about 67°. In other embodiments, the welds beads 392 can additionally or alternatively be offset in different manners. For example, a center of the array of the second weld beads 392b can be shifted laterally relative to a center of the array of the first weld beads 392a as shown in FIG. 3E.

After forming the second weld beads 392b in the second layer 104b of the additive material 102, the method 280 returns to block 282 and adds another layer of additive material before forming weld beads in the added layer that are at least partially offset from the weld beads in the layers below. For example, FIG. 3C illustrates the formation of an array of third weld beads 392c in a third layer 104c of the additive material 102. The additive material 102 is shown as partially transparent in FIG. 3C to illustrate the underlying first and second weld beads 392a, b. In some embodiments, the array of third weld beads 392c is formed to be generally identical to one or both of the arrays of first and second weld beads 392a, b. However, the third weld beads 392c can be rotationally offset from the array of first weld beads 392a by a second angle $\theta_2$ that is different than the first angle $\theta_1$ (FIG. 3B). In some embodiments, the second angle $\theta_2$ can be a multiple of the first angle $\theta_1$ (e.g., the second angle $\theta_2$ can be double the first angle $\theta_1$).

The method 280 can include repeatedly forming vertically stacked, offset arrays of the weld beads 392 in/at the sequential layers 104 of the additive material 102 (i.e., iterating through blocks 282 and 283) until a desired height, porosity, and/or other physical characteristic of the porous structure 390 is achieved. In some embodiments, individual ones of the arrays of weld beads 392 can be laterally offset from the arrays in the directly adjacent layers 104 by a predetermined angle (e.g., the first angle $\theta_1$). That is, the passes made by the energy director 150 can be rotated by the same angle for each sequentially deposited one of the layers 104.

Figure 3D:
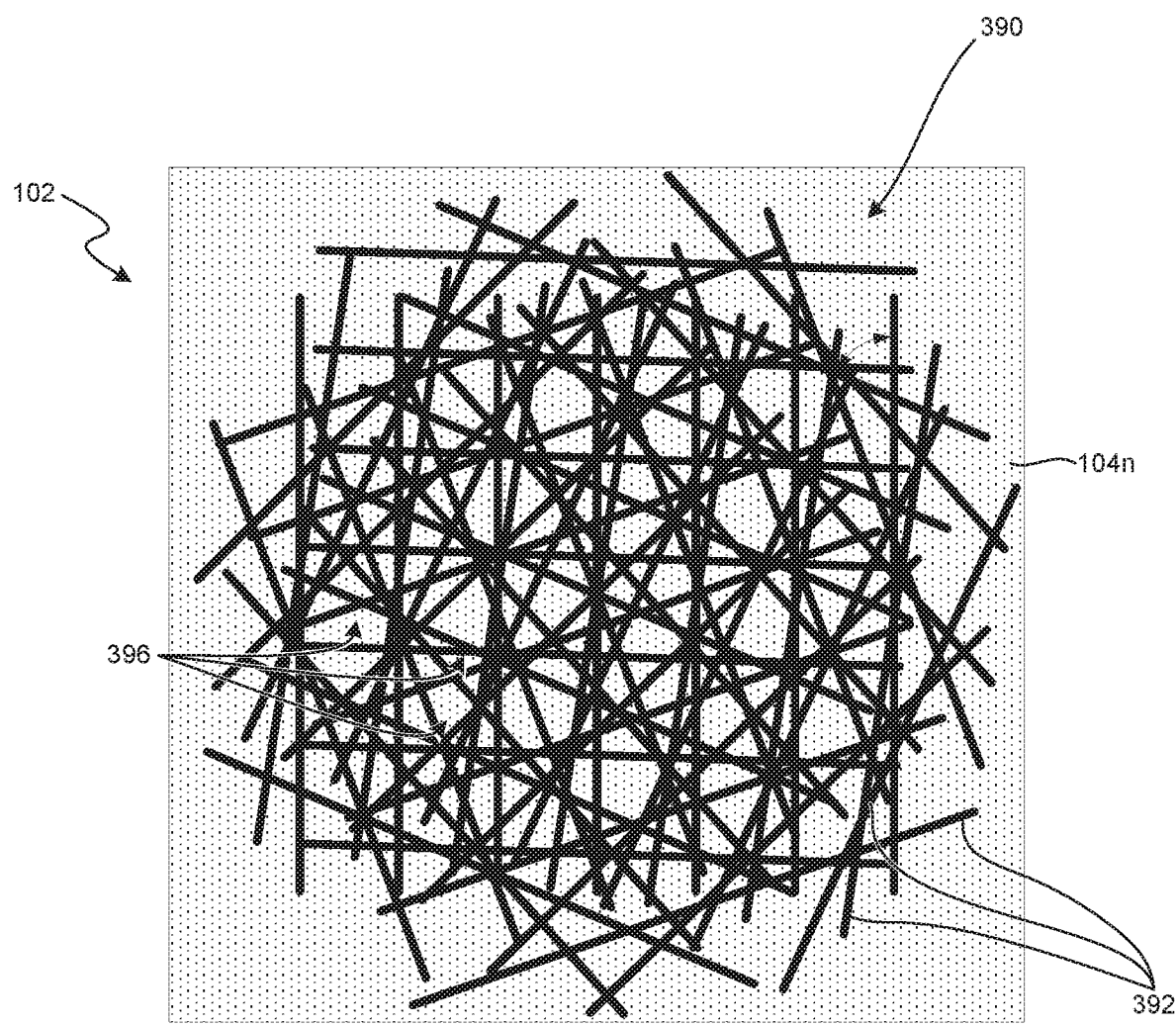
Figure 3E:
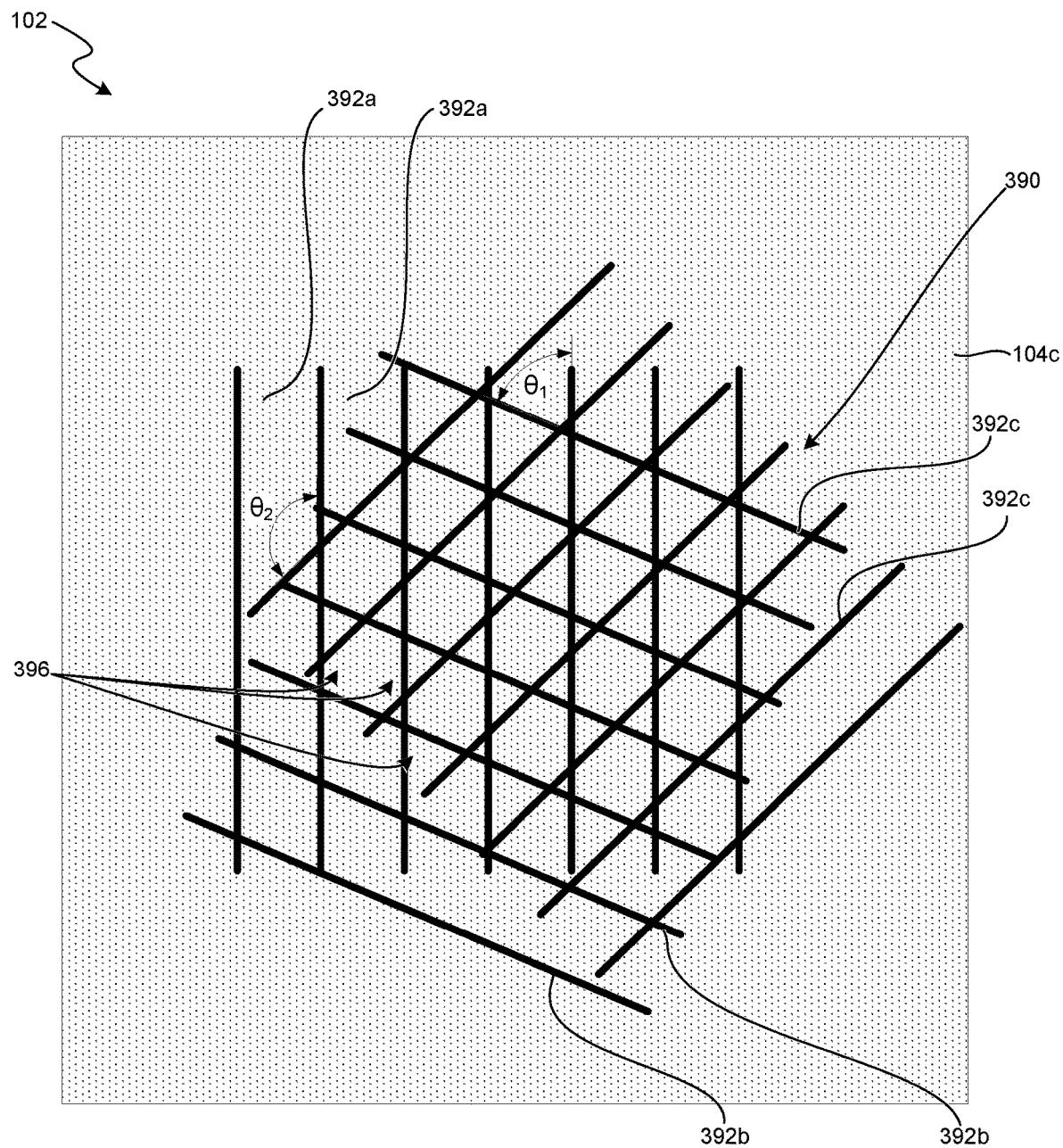

FIG. 3D illustrates the formation of an array of weld beads in the nth layer 104n of the additive material 102. The additive material 102 is shown as partially transparent in FIG. 3D to illustrate the underlying weld beads 392. Referring to FIGS. 3C and 3D together, the porous structure 390 defines a plurality of passageways 396 that extend vertically and/or in a serpentine fashion therethrough. In one aspect of the present technology, by offsetting (e.g., laterally (as shown in FIG. 3E) and/or rotationally) the weld beads 392 in each of the layers 104 of the additive material 102, none of the passageways 396 are discrete/continuous passageways that extend entirely through the porous structure 390 once the additive manufacturing process is complete. More specifically, by (i) laterally offsetting (as shown in FIG. 3E) and/or (ii) rotationally offsetting each array of the weld beads 392 by an angle that is not a factor of 360° (e.g., by 67°), the arrays will not be superimposed over one another such that the passageways 396 are continuous. Instead, the resulting structure includes a multitude of interconnected, tortuous, serpentine passageways (e.g., non-discrete passageways or flow paths) extending between opposing surfaces. As used herein, the term "non-discrete" refers to flow paths or passageways that are interconnected as they extend through porous structure 390. In some embodiments, the arrays of the weld beads 392 can be randomly offset relative to one another rather than another rather than offset by a predetermined angle.

It is expected that the use of non-discrete passageways can provide a porous structure that is more resistant to foreign object introduction. That is, the porous structure 390 is less susceptible to clogging because fluid flowing through the porous structure 390 can bypass clogs therein. Such passageways also inhibit or even prevent tube-like fluid flow patterns (e.g., jetting) through the porous structure 390. Indeed, it is expected that a more uniform fluid film will emerge from and/or weep through the porous structure 390—thereby improving the pressure distribution across, and fluid flow through, the porous structure 390. In another aspect of the present technology, the method 280 can include forming multiple vertically stacked arrays of offset weld beads until none of the passageways 396 offer a direct line of sight through the porous structure 390. This is expected to further inhibit or even prevent tube-like fluid flow patterns (e.g., jetting) through the porous structure 390.

In another aspect of the present technology, the porous structure 390 can be integrally and/or monolithically formed (e.g., printed) with a solid part such as, for example, a chamber, manifold, and/or other portion of a fuel injector for use in a rocket engine. Moreover, the porous structure 390 can be formed in difficult-to-access regions of a solid part, such as an internal geometry or chamber thereof. In contrast, many conventional porous media, such as "Rigimesh," are initially separate from, and then subsequently attached to, a solid part (e.g., via fasteners, a welded connection, etc.) only after the solid part is manufactured. Such a post-process connection may not be as strong as the monolithic configuration of the present technology and may not be possible depending on the geometry of the part.

In another aspect of the present technology, the porous structure 390 is computationally simple to model. In particular, the controller 109 can control the system 100 to manufacture the porous structure 390 without receiving a computer-generated model detailing and/or specifying each of the passageways therethrough. Rather, the controller 109 can generate the porous structure 390 based only on a few parameters such as, for example, a selected location or volume in which to form the porous structure 390 (e.g., relative to and/or on the part 108), a selected length, thickness, and spacing of the weld beads 392, and/or a selected offset parameter (e.g., a rotation angle and/or lateral offset distance (as shown in FIG. 3E)) for the arrays of weld beads 392. In some embodiments, the porous structure 390 can be computer modeled as a simple solid. In some such embodiments, the controller 109 can be configured to receive the computer model and control the operations and motions of the components of the system 100 to form the porous structure 390 based on the received computer model.

In some embodiments, the porous structure 390 is configured to provide a specific fluid flow rate therethrough. For example, the porous structure 390 can be manufactured to have a variable porosity selected to produce a desired flow rate and/or pressure differential through the porous structure 390. More specifically, the spacing (e.g., the distances $D_1$, $D_2$, etc.) between, and/or the thickness of, the weld beads 392 in different ones of the layers 104 can be varied to control the flow rate and/or the pressure differential through the porous structure 390. For example, reducing the spacing between the weld beads 392 and/or increasing the thickness of the weld beads 392 can reduce the flow rate of a fluid through the porous structure 390, while increasing the spacing between the weld beads 392 and/or decreasing the thickness of the weld beads 392 can increase the flow rate of the fluid through the porous structure 390.

Accordingly, in some embodiments the porous structure 390 can be utilized to provide transpiration cooling of a part intended for use in high temperature and/or pressure environments. For example, the porous structure 390 can be formed as a face plate of a fluid fuel injector, such as for use in a rocket engine. The fuel can bleed or weep through the porous structure 390 and cool the face plate and/or other components of the fuel injector via transpiration cooling. At the same time, the porous structure 390 can provide a specific flow rate and/or pressure drop therethrough to provide uniform and even fuel injection via the injector.

In some embodiments, the porous structure 390 can be utilized as a filter. In particular, the porosity of the porous structure 390 can be selected (e.g., via variations in the spacing between, and/or thickness of, the weld beads 392) based on the components to be filtered. Moreover, the non-discrete passageways 396 of the porous structure 390 can advantageously resist clogging when the porous structure 390 is used as a filter.

The above detailed description of embodiments of the present technology are not intended to be exhaustive or to limit the technology to the precise forms disclosed above. Although specific embodiments of, and examples for, the technology are described above for illustrative purposes, various equivalent modifications are possible within the scope of the technology, as those skilled in the relevant art will recognize. For example, although steps are presented in a given order, alternative embodiments may perform steps in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

As used herein, the phrase "and/or" as in "A and/or B" refers to A alone, B alone, and A and B. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

To the extent any materials incorporated herein by reference conflict with the present disclosure, the present disclosure controls.

We claim:

1. A method of manufacturing a porous medium, the method comprising:
   selectively heating a first layer of additive material to form an array of first weld beads having a first center, wherein the first weld beads are spaced apart from one another;
   selectively heating a second layer of the additive material directly adjacent to the first layer of additive material to form an array of second weld beads having a second center, wherein the second center is laterally offset from the first center, wherein the second weld beads are rotationally offset from the first weld beads by an angle that is not a factor of 360, and wherein the second weld beads are spaced apart from one another; and
   selectively heating a third layer of the additive material directly adjacent to the second layer of additive material to form an array of third weld beads having a third center, wherein the second center is laterally offset from the third center, wherein the third weld beads are spaced apart from one another, wherein the first weld beads, the second weld beads, and the third weld beads together form a monolithic structure, and wherein selectively heating the first layer, the second layer, and the third layer includes selectively heating at least one of the first layer, the second layer, and the third layer to attach to a solid portion of a rocket fuel injector so as to directly form the monolithic structure on the solid portion of the rocket fuel injector.

2. The method of claim 1, wherein the angle is 67°.

3. The method of claim 1, wherein individual ones of the first and second weld beads are linear, wherein the first weld beads are arranged parallel to one another, and wherein the second weld beads are arranged parallel to one another.

4. The method of claim 1, wherein the first weld beads are equally spaced apart from one another by a distance, and wherein the second weld beads are also equally spaced apart from one another by the distance.

5. The method of claim 4, wherein the distance is between 0.1-2.0 millimeter (mm).

6. The method of claim 1, wherein the first weld beads are non-equally spaced apart, and wherein the second weld beads are non-equally spaced apart.

7. The method of claim 1, wherein the first weld beads and the second weld beads each have a thickness of 45 micrometer (µm).

8. The method of claim 1, further comprising depositing the second layer of the additive material over the first layer of the additive material after selectively heating the first layer of the additive material.

* * * * *